(12) United States Patent
Karczewicz

(10) Patent No.: US 8,406,299 B2
(45) Date of Patent: Mar. 26, 2013

(54) DIRECTIONAL TRANSFORMS FOR INTRA-CODING

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1270 days.

(21) Appl. No.: 12/040,633

(22) Filed: Feb. 29, 2008

(65) Prior Publication Data

US 2008/0260030 A1  Oct. 23, 2008

Related U.S. Application Data

(60) Provisional application No. 60/912,364, filed on Apr. 17, 2007.

(51) Int. Cl.
*H04N 7/12* (2006.01)
(52) U.S. Cl. .................. 375/240.15; 375/240.24
(58) Field of Classification Search ............ 375/240.12, 375/240.15, 240.16, 240.24
See application file for complete search history.

(56) References Cited

U.S. PATENT DOCUMENTS

| | | | |
|---|---|---|---|
| 5,815,601 A * | 9/1998 | Katata et al. ............ 382/232 |
| 5,974,181 A * | 10/1999 | Prieto ................... 382/232 |
| 6,157,676 A | 12/2000 | Takaoka et al. |
| 6,476,805 B1 * | 11/2002 | Shum et al. ............ 345/420 |
| 6,654,503 B1 * | 11/2003 | Sudharsanan et al. ..... 382/244 |
| 7,142,231 B2 | 11/2006 | Chipchase et al. |
| 7,145,948 B2 * | 12/2006 | Ye et al. ................ 375/240.03 |
| 7,664,184 B2 * | 2/2010 | Reznic et al. ........... 375/240.26 |
| 7,751,478 B2 * | 7/2010 | Kim et al. .............. 375/240.12 |
| 7,751,479 B2 * | 7/2010 | Paniconi et al. ......... 375/240.12 |
| 7,792,390 B2 * | 9/2010 | Prakash et al. ............ 382/302 |
| 7,847,861 B2 | 12/2010 | Zhai et al. |
| 7,925,107 B2 * | 4/2011 | Kim et al. ................ 382/248 |
| 7,944,965 B2 * | 5/2011 | Bhaskaran et al. ........ 375/240 |
| 8,024,121 B2 * | 9/2011 | Tang .................... 702/6 |
| 8,036,264 B2 * | 10/2011 | Doshi ................. 375/240.01 |
| 8,135,064 B2 * | 3/2012 | Tasaka et al. .......... 375/240.16 |
| 8,238,428 B2 * | 8/2012 | Karczewicz ........... 375/240.15 |
| 2002/0055215 A1 | 5/2002 | Tamura et al. |
| 2003/0223493 A1 | 12/2003 | Ye et al. |
| 2005/0243920 A1 | 11/2005 | Murakami et al. |
| 2006/0120456 A1 | 6/2006 | Tasaka et al. |
| 2006/0153295 A1 * | 7/2006 | Wang et al. ............ 375/240.08 |

(Continued)

FOREIGN PATENT DOCUMENTS

| CN | 1662066 A | 8/2005 |
|---|---|---|
| JP | 1155678 A | 6/1989 |

(Continued)

OTHER PUBLICATIONS

VCEG-N54 is an ITU-T VCEG Group meeting contribution submitted by Greg Conklin of RealNetworks.

(Continued)

*Primary Examiner* — Dang Ton
*Assistant Examiner* — Brian O Connor
(74) *Attorney, Agent, or Firm* — John Rickenbrode

(57) ABSTRACT

Techniques for transforming the prediction error of intra-coded blocks using mode-dependent transform functions. In an embodiment, an encoder selects a set of transform functions to represent prediction error based on the spatial mode used for prediction. In an alternative embodiment, a decoder reconstructs an image block by using the signaled spatial mode to derive the corresponding set of transform functions. No additional signaling between encoder and decoder is required as compared to prior art implementations.

50 Claims, 6 Drawing Sheets

U.S. PATENT DOCUMENTS

| | | | |
|---|---|---|---|
| 2006/0218482 | A1 | 9/2006 | Ralston et al. |
| 2007/0002945 | A1 | 1/2007 | Kim |
| 2007/0025631 | A1* | 2/2007 | Kim et al. ............ 382/248 |
| 2007/0070082 | A1 | 3/2007 | Brennan |
| 2008/0260027 | A1 | 10/2008 | Karczewicz |
| 2008/0260031 | A1 | 10/2008 | Karczewicz |

FOREIGN PATENT DOCUMENTS

| | | | |
|---|---|---|---|
| JP | 2070127 | A | 3/1990 |
| JP | 2002135126 | A | 5/2002 |
| JP | 2006295408 | A | 10/2006 |
| JP | 2008022405 | A | 1/2008 |
| WO | WO2005107267 | A1 | 11/2005 |
| WO | 2008084817 | A1 | 7/2008 |
| WO | WO2008088140 | A1 | 7/2008 |

OTHER PUBLICATIONS

JVT-B118r4 was submitted to the JVT ISO/IEC MPEG/VCEG group by Thomas Wiegand and Gary Sullivan.

Fu, et al.: "A Comparative Study of Compensation Techniques in Directional DCT's," IEEE International Symposium on Circuits and Systems (ISCAS) 2007, pp. 521-524, May 27-30, 2007.

Karczewicz, M.: "Improved Intra Coding," ITU-Telecommunications Standardization Sector, Study Group 16, Question 6, Video Coding Experts Group (VCEG), Document No. VCEG-AF15, pp. 1-4, XP030003536, 32nd Meeting: San Jose, CA, USA, Apr. 20-21, 2007.

Robert, et al.: "Improving Intra mode coding in H.264/AVC through block oriented transforms," 2006 IEEE 8th Workshop on Multimedia Signal Processing, pp. 382-386. Oct. 3-6, 2006.

Sekiguchi, et al.: "Results of CE on Separate Prediction Modes for 4:4:4 Coding (CE9)," Joint Video Team (JVT) of ISO/IEC MPEG & ITU-T VCEG, (ISO/IEC JTC1/SC29/WG11 and ITU-T SG16 Q.6), Document No. JVT-R031, pp. 1-28, 18th Meeting: Bangkok, TH, Source: Mitsubishi Electric Corporation, Jan. 14-20, 2006.

Tan, et al.: "Spatially Compensated Block-Based Transform," Proceedings of the Seventh IASTED International Conference Signal and Image Processing, pp. 92-97, XP008097050, Aug. 15, 2005.

Xu, et al.: "Lifting-Based Directional DCT-Like Transform for Image Coding," IEEE International Conference on Image Processing (ICIP) 2007, vol. 3, pp. III-185-III-188.

Yu, et al.: "Low Complexity Intra Prediction," ITU-Telecommunications Standardization Sector, Study Group 16, Question 6, Video Coding Experts Group (VCEG), Document No. VCEG-Z14r1, pp. 1-4, 26th Meeting: Busan, KR, Apr. 16-22, 2005.

Zeng, et al.: "Directional Discrete Cosine Transforms for Image Coding," 2006 IEEE International Conference on Multimedia and Expo, pp. 721-724, Jul. 9-12, 2000.

Draft ISO/IEC 14496-10: 2002(E) Section 9.1.5.1; "Text of Final Committee Draft of Joint Video Specification (ITU-TRec, H.264, ISO/IEC 14496-10 AVC)," International Organisation for Standardisation Organisation Internatonale de Normalisation, ISO/IEC JTC1/SC29/WG11 Coding of Moving Pictures and Audio, MPEG02/N4920, p. 83 with figure 9-1, Editor Thomas Wiegand, Klagenfurt, AT, Jul. 2002.

ITU-T H.264: "Series H: Audiovisual and Multimedia Systems Infrastructure of audiovisual services—Coding of moving video; Advanced video coding for generic audiovisual services," pp. 1-341, Telecommunication Standardization Sector of ITU, International Telecommunication Union, Mar. 2005.

International Search Report—PCT/US2008/060535, International Searching Authority—European Patent Office—Oct. 14, 2008.

Written Opinion—PCT/US2008/060535, International Searching Authority—European Patent Office—Oct. 14, 2008.

"Advanced Video Coding for Generic Audiovisual Services," ITU-T Standard Pre-published (P), International Telecommunication Union, Geneva, N. H264 3/5, Mar. 1, 2005, XP002448756.

Bing Zeng et al: "Directional Discrete Cosine Transforms for Image Coding" Multimedia and Expo, 2006 IEEE International Conference on, IEEE, Jul. 1, 2006, pp. 721-724, XP031 032937 ISBN: 97S-1-4244-0366-0.

International Search Report—PCT/US2008/060537, International Searching Authority—European Patent Office—Oct. 15, 2008.

International Search Report—PCT/US2008/060539, International Searching Authority—European Patent Office—Oct. 31, 2008.

"Text of ISO/ IEC 14496-10 FCD Advanced Video Coding" Video Standards and Drafts, various authors, No. N4920, Aug. 11, 2002, XP030012343, Section 9.1.5.1, p. 83 with figure 9-1.

Written Opinion—PCT/US2008/060537, International Searching Authority—European Patent Office—Oct. 15, 2008.

Written Opinion—PCT/US2008/060539, International Searching Authority—European Patent Office—Oct. 31, 2008.

Yu L, Feng Y.: "Low-complexity intra prediction" Video Standards and Drafts, No. VCEG-Z14r1, Apr. 18, 2005, XP030003459.

Fu, Jingjing, et al, "Diagonal Discrete Cosine Transforms for Image Coding," (Nov. 2, 2006), Advances in Multimedia Information Processing—Proceedings of the 7th Pacific RIM Conference on Multimedia, PCM 2006, Huangzhou, China, Nov. 2-4, 2006 Lecture Notes in Computer Science;LNCS, Springer, Berlin, DE, pp. 150-158, XP019047687, ISBN: 978-3-540-48766-1.

Taiwan Search Report—TW097114024—TIPO—Feb. 26, 2012.

Peng Zhang et al. "Multiple modes intra-prediction in intra coding," Multimedia and EXPO, 2004. ICME '04.2004 IEEE International Conference on Taipei, Taiwan Jun. 27-30, 2004, Piscataway, NJ, USA, IEEE,vol. 1, Jun. 27, 2004, pp. 419-422.

\* cited by examiner

DIRECTIONAL TRANSFORMS FOR INTRA-CODING

This patent application is based on and claims priority to U.S. patent application Ser. No. 60/912,364, filed Apr. 17, 2007, and is a co-pending application of U.S. patent application Ser. No. 12/040,673, filed Feb. 29, 2008, entitled Pixel-By-Pixel Weighting For Intra-Frame Coding, and U.S. patent application Ser. No. 12/040,696, filed Feb. 29, 2008, entitled Mode Uniformity Signaling For Intra-Coding, all of which can be assigned to the assignee of the present invention, the contents of which are hereby expressly incorporated by reference herein.9

CLAIM OF PRIORITY

This patent application is based on and claims priority to U.S. patent application Ser. No. 60/912,364, filed Apr. 17, 2007, and is a application entitled Pixel-By-Pixel Weighting For Intra-Frame Coding, and entitled Mode Uniformity Signaling For Intra-Coding, all of which can be assigned to the assignee of the present invention, the contents of which are hereby expressly incorporated by reference herein.

This patent application is based on and claims priority to U.S. patent application Ser. No. 60/912,364, filed Apr. 17, 2007, and is a co-pending application of U.S. patent application Ser. No. 12/040,673, filed Feb. 29, 2008, entitled Pixel-By-Pixel Weighting For Intra-Frame Coding, and U.S. patent application Ser. No. 12/040,696, filed Feb. 29, 2008, entitled Mode Uniformity Signaling For Intra-Coding, all of which can be assigned to the assignee of the present invention, the contents of which are hereby expressly incorporated by reference herein.

TECHNICAL FIELD

The disclosure relates to digital video processing and, more particularly, to techniques for intra-frame video encoding and decoding.

BACKGROUND

In video encoding, a frame of a video sequence may be partitioned into rectangular regions or blocks. A video block may be encoded in Intra-mode (I-mode) or Inter-mode (P-mode).

FIG. 1 shows a diagram of a prior art video encoder for the I-mode. In FIG. 1, a spatial predictor 102 forms a predicted block 103 from video block 100 by using pixels from neighboring blocks in the same frame. The neighboring blocks used for prediction may be specified by a spatial mode 101. A summer 104 computes the prediction error 106, i.e., the difference between the image block 100 and the predicted block 103. Transform module 108 projects the prediction error 106 onto a set of basis or transform functions. In typical implementations, the transform functions can be derived from the discrete cosine transform (DCT), Karhunen-Loeve Transform (KLT), or any other transforms. A set of transform functions can be expressed as $\{f_0, f_1, f_2, \ldots, f_N\}$, where each $f_n$ denotes an individual transform function.

The transform module 108 outputs a set of transform coefficients 110 corresponding to the weights assigned to each of the transform functions. For example, a set of coefficients $\{c_0, c_1, c_2, \ldots, c_N\}$ may be computed, corresponding to the set of transform functions $\{f_0, f_1, f_2, \ldots, f_N\}$. The transform coefficients 110 are subsequently quantized by quantizer 112 to produce quantized transform coefficients 114. The quantized coefficients 114 and spatial mode 101 may be transmitted to the decoder.

FIG. 1A depicts a video decoder for the I-mode. In FIG. 1A, quantized coefficients 1000 are provided by the encoder to the decoder, and supplied to the inverse transform module 1004. The inverse transform module 1004 reconstructs the prediction error 1003 based on the coefficients 1000 and the fixed set of transform functions, e.g., $\{f_0, f_1, f_2, \ldots, f_N\}$. The spatial mode 1002 is supplied to the inverse spatial prediction module 1006, which generates a predicted block 1007 based on pixel values of already decoded neighboring blocks. The predicted block 1007 is combined with the prediction error 1003 to generate the reconstructed block 1010. The difference between the reconstructed block 1010 and the original block 100 in FIG. 1 is known as the reconstruction error.

An example of a spatial predictor 102 in FIG. 1 is herein described with reference to document VCEG-N54, published by ITU—Telecommunication Standardization Sector of Video Coding Expert Group (VCEG) in September 2001. In the embodiment, a coder offers 9 spatial modes of prediction for 4×4 blocks, including DC prediction (Mode 2) and 8 directional modes, labeled 0 through 8, as shown in FIG. 2. Each spatial mode specifies a set of already encoded pixels to use to encode a neighboring pixel, as illustrated in FIG. 3. In FIG. 3, the pixels from a to p are to be encoded, and already encoded pixels A to L are used for predicting the pixels a to p. If, for example, Mode 0 is selected, then pixels a, e, i and m are predicted by setting them equal to pixel A, and pixels b, f, j and n are predicted by setting them equal to pixel B, etc. Similarly, if Mode 1 is selected, pixels a, b, c and d are predicted by setting them equal to pixel I, and pixels e, f, g and h are predicted by setting them equal to pixel J, etc. Thus, Mode 0 is a predictor in the vertical direction; and Mode 1 is a predictor in the horizontal direction. The encoder is further described in the aforementioned document, and in document JVT-B118r4, published by the Joint Video Team of ISO/IEC MPEG and ITU-T VCEG in February 2002.

It has been noted that when performing the mode-based spatial prediction described above, the reconstruction error may exhibit regular spatial patterns. For example, the reconstruction error may have strong correlation in the direction corresponding to the mode used for prediction. It would be desirable to reduce the reconstruction error by reducing direction-dependent spatial patterns in the reconstruction error.

SUMMARY

An aspect of the present disclosure provides a method for encoding an image block, the image block comprising a set of pixel values, the method comprising selecting a spatial mode for predicting pixels in the image block based on neighboring pixels; generating a predicted block for the image block based on the neighboring pixels and the selected spatial mode; computing a prediction error between the image block and the predicted block; based on the selected spatial mode, selecting at least one transform function for representing the prediction error; and transforming the prediction error using the at least one transform function to derive at least one transform coefficient.

Another aspect of the present disclosure provides a method for reconstructing an image block, the image block comprising a set of pixel values, the method comprising: receiving a spatial mode for predicting pixels in the image block based on neighboring pixels; generating a predicted block based on the spatial mode and neighboring pixels; based on the spatial mode, selecting at least one transform function for representing the prediction error; receiving at least one transform coefficient corresponding to the at least one transform function; generating the prediction error based on the at least one transform function and the at least one transform coefficient; and combining the predicted block and the prediction error to generate a reconstructed block.

Yet another aspect of the present disclosure provides an apparatus for encoding an image block, the image block comprising a set of pixel values, the apparatus comprising: a spatial predictor for selecting a spatial mode for predicting pixels in the image block based on neighboring pixels, the spatial predictor generating a predicted block, the difference between the predicted block and the image block comprising a prediction error; and a transform module for transforming the prediction error using at least one transform function, the transform module generating at least one transform coefficient corresponding to the at least one transform function; the transform module selecting the at least one transform function based on the spatial mode.

Yet another aspect of the present disclosure provides an apparatus for reconstructing an image block, the image block comprising a set of pixel values, the apparatus comprising an inverse spatial predictor for generating a predicted block, the inverse spatial predictor receiving a spatial mode for generating pixels in the predicted block based on neighboring pixels; and an inverse transform module for generating a prediction error, the inverse transform module receiving the spatial mode and at least one transform coefficient corresponding to at least one transform function, the inverse transform module further selecting the at least one transform function based on the spatial mode; the apparatus reconstructing the image block by combining the predicted block and the prediction error.

Yet another aspect of the present disclosure provides an apparatus for encoding an image block, the image block comprising a set of pixel values, the apparatus comprising means for selecting a spatial mode for generating a predicted block based on neighboring pixels, the difference between the image block and the predicted block comprising a prediction error; and means for transforming the prediction error into at least one transform coefficient using at least one transform function, the at least one transform function selected based on the spatial mode.

BRIEF DESCRIPTION OF DRAWINGS

Figure 3:
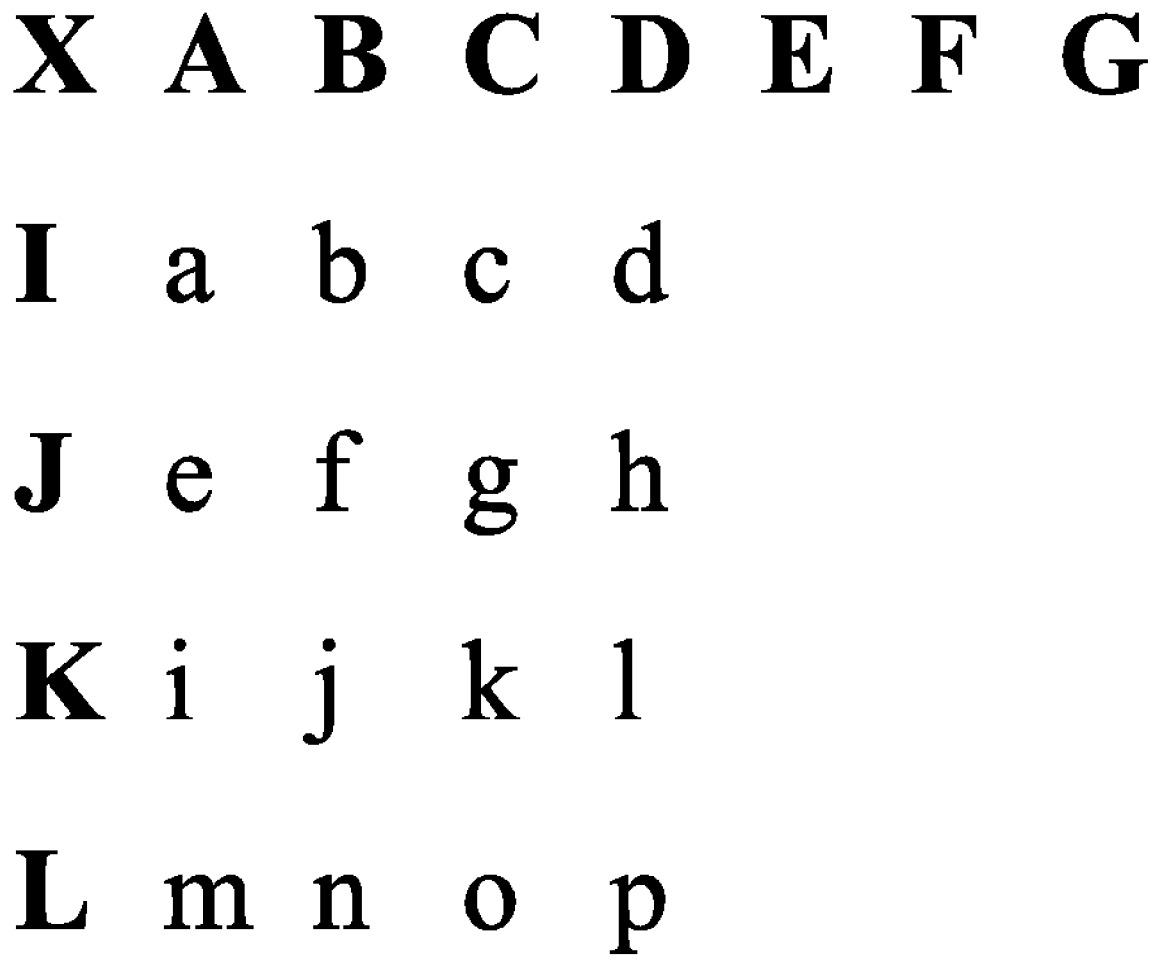

FIG. 3 illustrates pixel prediction using spatial modes.

DETAILED DESCRIPTION

Disclosed herein are techniques for providing mode-dependent transform functions to represent the prediction error.

In an embodiment, a transform module projects the prediction error from the spatial predictor onto transform functions that are selected based on the spatial mode. The transform module may select a unique set of transform functions for each spatial mode. For example, the mode-dependent transform functions may be characterized as shown in the following table:

TABLE 1

| Mode | Set of transform functions |
|---|---|
| 0 | $\{f_{00}, f_{10}, f_{20}, \ldots, f_{N0}\}$ |
| 1 | $\{f_{01}, f_{11}, f_{21}, \ldots, f_{N1}\}$ |
| 2 | $\{f_{02}, f_{12}, f_{22}, \ldots, f_{N2}\}$ |
| etc. | etc. |

In Table 1, $f_{xy}$ denotes the x-th transform function corresponding to the y-th spatial mode.

Figure 1:
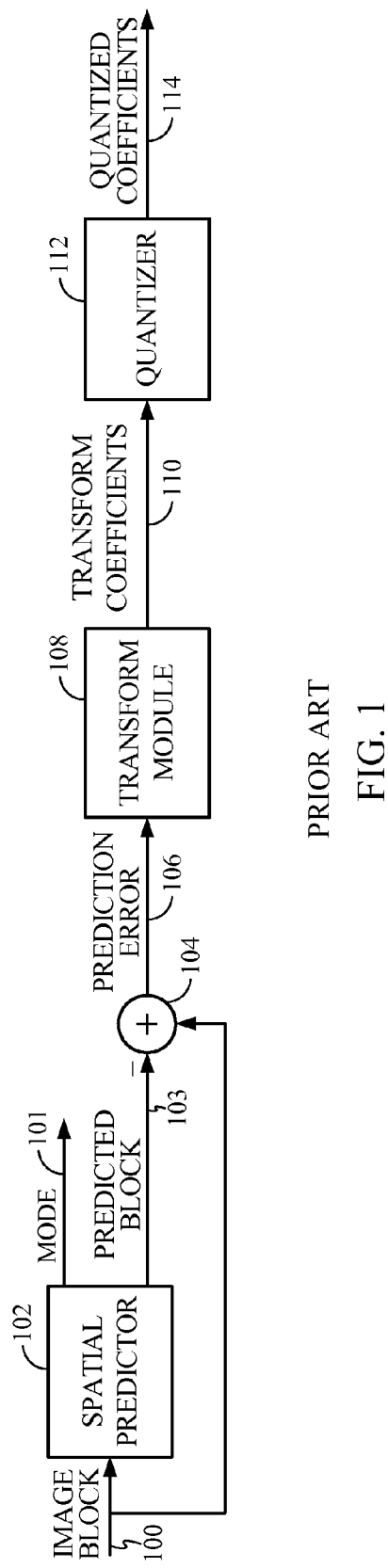
FIG. 1 shows a diagram of a prior art video encoder for the I-mode.
Figure 1A:
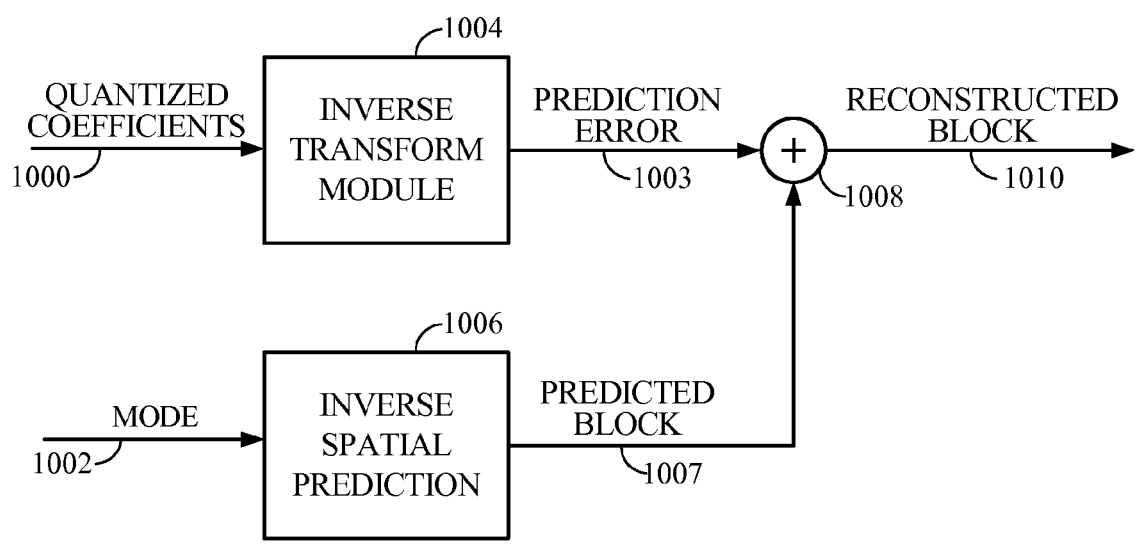
FIG. 1A depicts a prior art video decoder for the I-mode.
Figure 2:
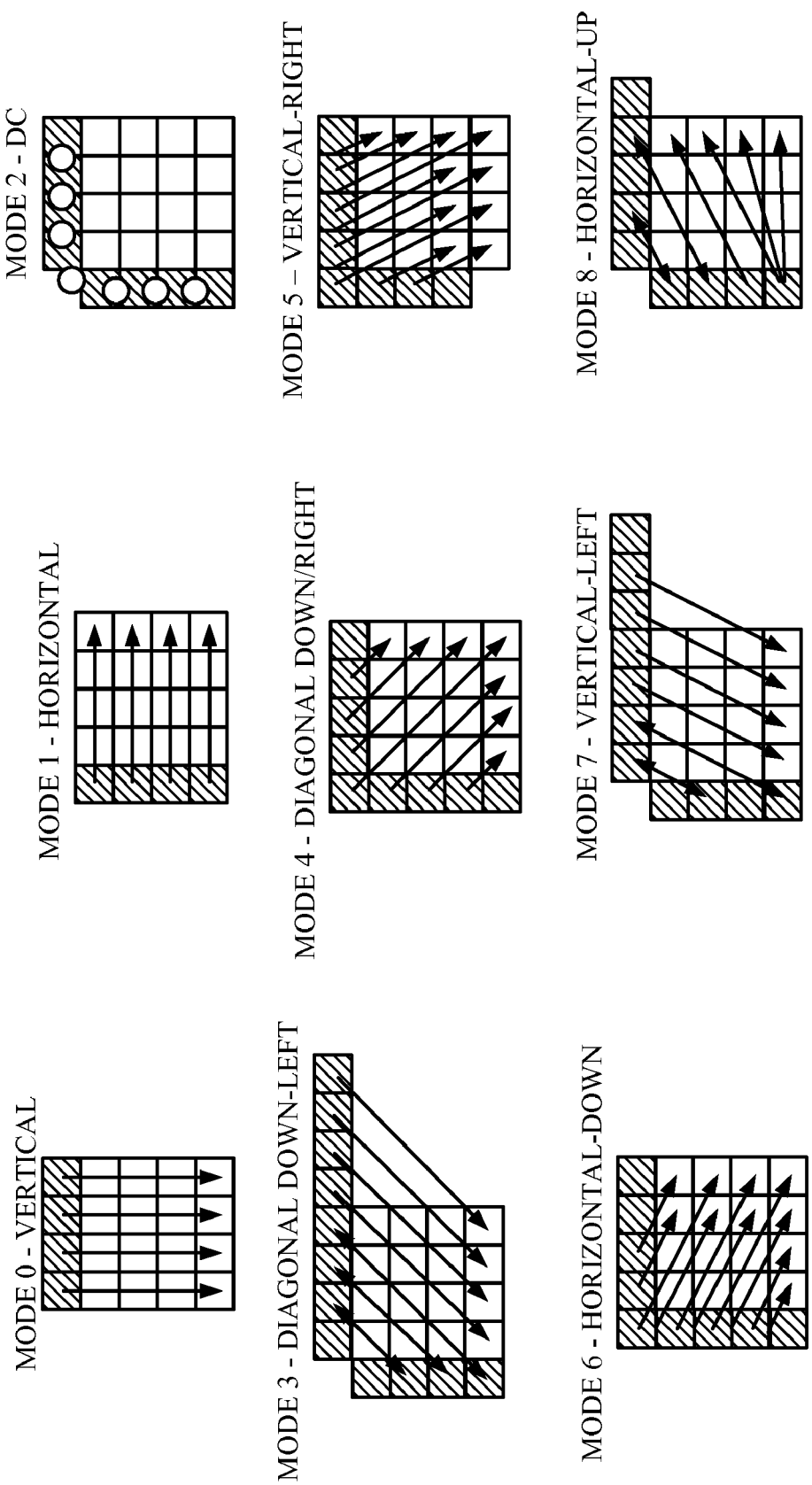
FIG. 2 shows spatial modes described in document VCEG-N54, published by ITU—Telecommunication Standardization Sector of Video Coding Expert Group (VCEG) in September 2001.

According to the present disclosure, the mode chosen by the spatial predictor uniquely specifies the particular set of transform functions used to represent the prediction error associated with that mode. Hence only the mode needs to be signaled from the encoder to the decoder to allow the decoder to recover the appropriate transform functions. Accordingly, no additional signaling is needed between encoder and decoder as compared to the implementations shown in FIGS. 1 and 1A.

Note while Table 1 shows an embodiment wherein (N+1) functions are assigned to each mode, the number of functions assigned to each mode need not be the same. For example, in an embodiment, mode 0 may have (N+1) assigned transform functions, while mode 1 may have N assigned transform functions, mode 2 may have (N−1) assigned transform functions, etc.

Figure 4:
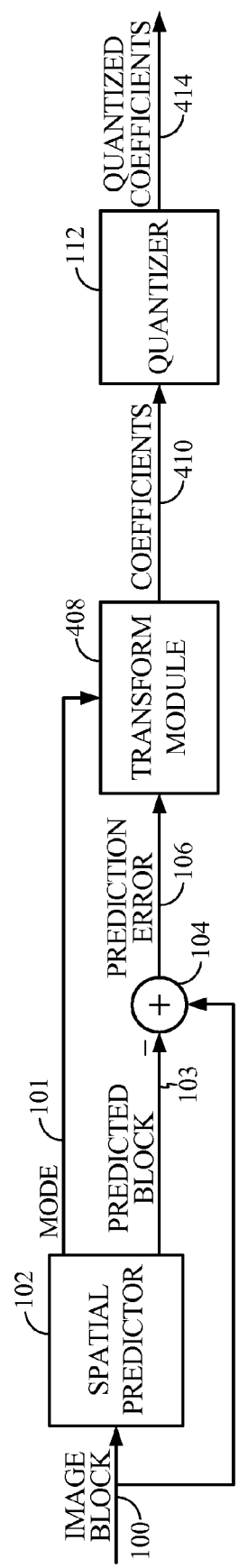
FIG. 4 depicts an embodiment of an encoder according to the present disclosure.

FIG. 4 depicts an embodiment of an encoder according to the present disclosure. Numbered elements in FIG. 4 correspond to similarly numbered elements in FIG. 1. The operation of the encoder in FIG. 4 is similar to that of FIG. 1, except that the spatial mode 101 selected by the spatial predictor 102 is provided to a modified transform module 408. According to the present disclosure, the spatial mode 101 indicates to the transform module 408 which set of transform functions to use to transform the prediction error 106.

Figure 5:
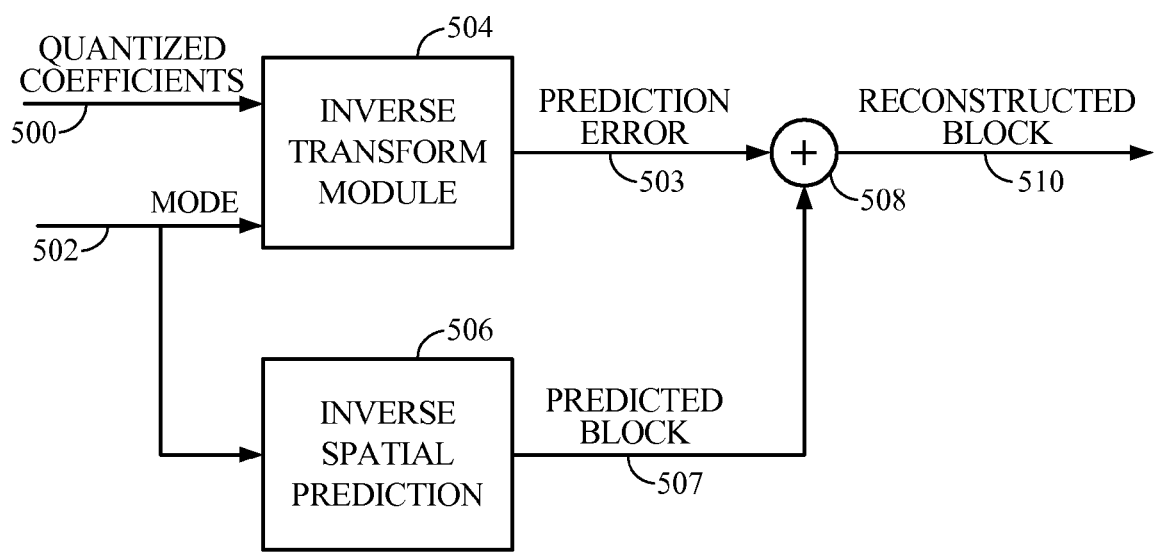
FIG. 5 depicts an embodiment of a decoder according to the present disclosure.

FIG. 5 depicts an embodiment of a decoder according to the present disclosure. The quantized coefficients 500 and spatial mode 502 are signaled to the decoder from the encoder. Given the coefficients 500 and spatial mode 502, the inverse transform module 504 reconstructs the prediction error 505. The inverse transform module 504 has a priori knowledge of the set of transform functions corresponding to each mode, and thus, given the mode 504, can generate the appropriate transform functions corresponding to the coefficients 500.

The mode 502 is also provided to the inverse spatial predictor 506, which derives the predicted block 507. The predicted block 507 and the prediction error 505 are combined by adder 508 to generate the reconstructed video block 510.

Note aspects of the present disclosure need not be limited to any particular mapping of mode to transform functions. In an embodiment, the set of transform functions for each mode may be empirically derived to minimize the reconstruction error of blocks encoded in that mode. For example, a set of transform functions for each mode may be derived by taking a suitably large number of "training" video blocks, and finding the set of transform functions that minimize the prediction error for each mode. For example, a set of transform functions for mode 0 may be determined by finding a best set of transform functions for representing the prediction error of 10,000 training blocks to be encoded in mode 0. The transform functions may be based on the Karhunen-Loeve Transform (KLT), Discrete Cosine Transform (DCT), or any other transforms known in the art.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

The invention claimed is:

1. A method for encoding an image block, the image block comprising a set of pixel values, the method comprising:
   selecting, by one or more processors, a spatial directional mode for predicting pixels in the image block based on neighboring pixels;
   generating, by the one or more processors, a predicted block for the image block based on the neighboring pixels and the selected spatial directional mode;
   computing, by the one or more processors, a prediction error between the image block and the predicted block;
   based on the selected spatial directional mode, selecting, by the one or more processors, a set of transform basis functions for representing the prediction error from a plurality of sets of transform basis functions for a particular image block size, the plurality of sets of transform basis functions including a set of transform basis functions for a first spatial directional mode that is different from a set of transform basis functions for a second spatial directional mode; and
   transforming, by the one or more processors, the prediction error using the set of transform basis functions to derive at least one transform coefficient.

2. The method of claim 1, wherein the selected set of transform basis functions is based on a Karhunen-Loeve Transform (KLT).

3. The method of claim 2, wherein the selected set of transform basis functions is configured to reduce prediction error for the selected spatial directional mode.

4. The method of claim 2, wherein the selected set of transform basis functions is empirically derived to reduce prediction error for the selected spatial directional mode.

5. The method of claim 2, wherein the first set of transform basis functions comprises the selected set of transform basis functions that is based on the Karhunen-Loeve Transform (KLT), and the second set of transform basis functions is based on a discrete cosine transform (DCT).

6. The method of claim 1, wherein the particular image block size is a 4×4 image block size.

7. A method for reconstructing an image block, the image block comprising a set of pixel values, the method comprising:
   receiving, by one or more processors, a spatial directional mode for predicting pixels in the image block based on neighboring pixels;
   generating, by the one or more processors, a predicted block based on the spatial directional mode and the neighboring pixels;
   based on the spatial directional mode, selecting, by the one or more processors, a set of transform basis functions from a plurality of sets of transform basis functions for a particular image block size, the plurality of sets of transform basis functions including a set of transform basis functions for a first spatial directional mode that is different from a set of transform basis functions for a second spatial directional mode;
   receiving, by the one or more processors, at least one transform coefficient;
   generating, by the one or more processors, a prediction error based on the set of transform basis functions and the at least one transform coefficient; and
   combining, by the one or more processors, the predicted block and the prediction error to generate a reconstructed block.

8. The method of claim 7, wherein the selected set of transform basis functions is based on a Karhunen-Loeve Transform (KLT).

9. The method of claim 8, wherein the selected set of transform basis functions is configured to reduce prediction error for the spatial directional mode.

10. The method of claim 8, wherein the selected set of transform basis functions is empirically derived to reduce prediction error for the spatial directional mode.

11. The method of claim 8, wherein the first set of transform basis functions comprises the selected set of transform basis functions that is based on the Karhunen-Loeve Transform (KLT), and the second set of transform basis functions is based on a discrete cosine transform (DCT).

12. The method of claim 7, wherein the particular image block size is a 4×4 image block size.

13. An apparatus for encoding an image block, the image block comprising a set of pixel values, the apparatus comprising:
   one or more processors configured to:
      select a spatial directional mode for predicting pixels in the image block based on neighboring pixels;
      generate a predicted block based on the neighboring pixels and the selected spatial directional mode, the difference between the predicted block and the image block comprising a prediction error;
      select, based on the spatial directional mode, a set of transform basis functions from a plurality of sets of transform basis functions for a particular image block size, the plurality of sets of transform basis functions including a set of transform basis functions for a first spatial directional mode that is different from a set of transform basis functions for a second spatial directional mode; and transform the prediction error using the set of transform basis functions to derive at least one transform coefficient.

14. The apparatus of claim 13, wherein the apparatus is an integrated circuit.

15. The apparatus of claim 13, wherein the apparatus is a wireless handset.

16. The apparatus of claim 13, wherein the selected set of transform basis functions is based on a Karhunen-Loeve Transform (KLT).

17. The apparatus of claim 16, wherein the selected set of transform basis functions is configured to reduce prediction error for the selected spatial directional mode.

18. The apparatus of claim 16, wherein the selected set of transform basis functions is empirically derived to reduce prediction error for the selected spatial directional mode.

19. The apparatus of claim 16, wherein the first set of transform basis functions comprises the selected set of transform basis functions that is based on the Karhunen-Loeve Transform (KLT), and the second set of transform basis functions is based on a discrete cosine transform (DCT).

20. The apparatus of claim 13, wherein the particular image block size is a 4×4 image block size.

21. An apparatus for reconstructing an image block, the image block comprising a set of pixel values, the apparatus comprising:
one or more processors configured to:
receive a spatial directional mode for generating pixels in the predicted block based on neighboring pixels;
generate a predicted block based on the spatial directional mode and the neighboring pixels;
receive at least one transform coefficient;
select, based on the spatial directional mode, a set of transform basis functions from a plurality of sets of transform basis functions for a particular image block size;
generate a prediction error based on the set of transform basis functions and the at least one transform coefficient, the plurality of sets of transform basis functions including a set of transform basis functions for a first spatial directional mode that is different from a set of transform basis functions for a second spatial directional mode; and
reconstruct the image block by combining the predicted block and the prediction error.

22. The apparatus of claim 21, wherein said apparatus is an integrated circuit.

23. The apparatus of claim 21, wherein said apparatus is a wireless handset.

24. The apparatus of claim 21, wherein the selected set of transform basis functions is based on a Karhunen-Loeve Transform (KLT).

25. The apparatus of claim 24, wherein the selected set of transform basis functions is configured to reduce prediction error for the spatial directional mode.

26. The apparatus of claim 24, wherein the selected set of transform basis functions is empirically derived to reduce prediction error for the spatial directional mode.

27. The apparatus of claim 24, wherein the first set of transform basis functions comprises the selected set of transform basis functions that is based on the Karhunen-Loeve Transform (KLT), and the second set of transform basis functions is based on a discrete cosine transform (DCT).

28. The apparatus of claim 21, wherein the particular image block size is a 4×4 image block size.

29. An apparatus for encoding an image block, the image block comprising a set of pixel values, the apparatus comprising:
means for selecting a spatial directional mode for generating a predicted block based on neighboring pixels, the difference between the image block and the predicted block comprising a prediction error; and
means for transforming the prediction error into at least one transform coefficient using a set of transform basis functions, the set of transform basis functions being selected from a plurality of sets of transform basis functions for a particular image block size based on the spatial directional mode, the plurality of sets of transform basis functions including a set of transform basis functions for a first spatial directional mode that is different from a set of transform basis functions for a second spatial directional mode.

30. The apparatus of claim 29, wherein said apparatus is an integrated circuit.

31. The apparatus of claim 29, wherein said apparatus is a wireless handset.

32. The apparatus of claim 29, wherein the selected set of transform basis functions is based on a Karhunen-Loeve Transform (KLT).

33. The apparatus of claim 32, wherein the selected set of transform basis functions is configured to reduce prediction error for the selected spatial directional mode.

34. The apparatus of claim 32, wherein the selected set of transform basis functions is empirically derived to reduce prediction error for the selected spatial directional mode.

35. The apparatus of claim 32, wherein the first set of transform basis functions comprises the selected set of transform basis functions that is based on the Karhunen-Loeve Transform (KLT), and the second set of transform basis functions is based on a discrete cosine transform (DCT).

36. A computer program product for encoding an image block, the image block comprising a set of pixel values, the product comprising:
a non-transitory computer-readable medium storing computer-executable code that, when executed by a computer, causes the computer to:
select a spatial directional mode for predicting pixels in the image block based on neighboring pixels;
generate a predicted block for the image block based on the neighboring pixels and the selected spatial directional mode;
compute a prediction error between the image block and the predicted block;
based on the selected spatial directional mode, select a set of transform basis functions for representing the prediction error from a plurality of sets of transform basis functions for a particular image block size, the plurality of sets of transform basis functions including a set of transform basis functions for a first spatial directional mode that is different from a set of transform basis functions for second spatial directional mode; and
transform the prediction error using the set of transform basis functions to derive at least one transform coefficient.

37. The computer program product of claim 36, wherein the selected set of transform basis functions is based on a Karhunen-Loeve Transform (KLT).

38. The computer program product of claim 37, wherein the selected set of transform basis functions is configured to reduce prediction error for the selected spatial directional mode.

39. The computer program product of claim 37, wherein the selected set of transform basis functions is empirically derived to reduce prediction error for the selected spatial directional mode.

40. The computer program product of claim 37, wherein the first set of transform basis functions comprises the selected set of transform basis functions that is based on the Karhunen-Loeve Transform (KLT), and the second set of transform basis functions is based on a discrete cosine transform (DCT).

41. A computer program product for reconstructing an image block, the image block comprising a set of pixel values, the product comprising:
 a non-transitory computer-readable medium storing computer-executable code that, when executed by a computer, causes the computer to:
  receive a spatial directional mode for predicting pixels in the image block based on neighboring pixels;
  generate a predicted block based on the spatial directional mode and the neighboring pixels;
  based on the spatial directional mode, select a set of transform basis functions from a plurality of sets of transform basis functions for a particular image block size, the plurality of sets of transform basis functions including a set of transform basis functions for a first spatial directional mode that is different from a set of transform basis functions for a second spatial directional mode;
  receive at least one transform coefficient;
  generate a prediction error based on the set of transform basis functions and the at least one transform coefficient; and
  combine the predicted block and the prediction error to generate a reconstructed block.

42. The computer program product of claim 41, wherein the selected set of transform basis functions is based on a Karhunen-Loeve Transform (KLT).

43. The computer program product of claim 42, wherein the selected set of transform basis functions is configured to reduce prediction error for the spatial directional mode.

44. The computer program product of claim 42, wherein the selected set of transform basis functions is empirically derived to reduce prediction error for the spatial directional mode.

45. The computer program product of claim 42, wherein the first set of transform basis functions comprises the selected set of transform basis functions that is based on the Karhunen-Loeve Transform (KLT), and the second set of transform basis functions is based on a discrete cosine transform (DCT).

46. An apparatus for reconstructing an image block, the image block comprising a set of pixel values, the apparatus comprising:
 means for receiving a spatial directional mode for predicting pixels in the image block based on neighboring pixels;
 means for generating a predicted block based on the spatial directional mode and neighboring pixels;
 means for selecting, based on the spatial directional mode, a set of transform basis functions from a plurality of sets of transform basis functions for a particular image block size, the plurality of sets of transform basis functions including a set of transform basis functions for a first spatial directional mode that is different from a set of transform basis functions for a second spatial directional mode;
 means for receiving at least one transform coefficient;
 means for generating a prediction error based on the set of transform basis functions and the at least one transform coefficient; and
 means for combining the predicted block and the prediction error to generate a reconstructed block.

47. The apparatus of claim 46, wherein the selected set of transform basis functions is based on a Karhunen-Loeve Transform (KLT).

48. The apparatus of claim 47, wherein the selected set of transform basis functions is configured to reduce prediction error for the spatial directional mode.

49. The apparatus of claim 47, wherein the selected set of transform basis functions is empirically derived to reduce prediction error for the spatial directional mode.

50. The apparatus of claim 47, wherein the first set of transform basis functions comprises the selected set of transform basis functions that is based on the Karhunen-Loeve Transform (KLT), and the second set of transform basis functions is based on a discrete cosine transform (DCT).

* * * * *